United States Patent
Honda et al.

(10) Patent No.: US 12,531,633 B2
(45) Date of Patent: Jan. 20, 2026

(54) OPTICAL COMMUNICATION DEVICE, OPTICAL ACCESS SYSTEM AND OPTICAL COMMUNICATION METHOD

(71) Applicant: NTT, Inc., Tokyo (JP)

(72) Inventors: Kazuaki Honda, Musashino (JP); Yumiko Senoo, Musashino (JP); Shin Kaneko, Musashino (JP); Kazutaka Hara, Musashino (JP)

(73) Assignee: NTT, Inc., Tokyo (JP)

( * ) Notice: Subject to any disclaimer, the term of this patent is extended or adjusted under 35 U.S.C. 154(b) by 284 days.

(21) Appl. No.: 18/037,051

(22) PCT Filed: Nov. 19, 2020

(86) PCT No.: PCT/JP2020/043208
§ 371 (c)(1),
(2) Date: May 15, 2023

(87) PCT Pub. No.: WO2022/107279
PCT Pub. Date: May 27, 2022

(65) Prior Publication Data
US 2024/0031020 A1    Jan. 25, 2024

(51) Int. Cl.
*H04B 10/077* (2013.01)
*H04B 10/50* (2013.01)
*H04L 12/44* (2006.01)
*H04Q 11/00* (2006.01)

(52) U.S. Cl.
CPC ........... *H04B 10/077* (2013.01); *H04L 12/44* (2013.01); *H04Q 11/0067* (2013.01); *H04B 10/50* (2013.01)

(58) Field of Classification Search
None
See application file for complete search history.

(56) References Cited

U.S. PATENT DOCUMENTS

2011/0318009 A1* 12/2011 Shiba .................. H04L 12/2898
398/67
2015/0055956 A1* 2/2015 Lee ...................... H04B 10/671
398/79

FOREIGN PATENT DOCUMENTS

JP   2016197787 A   11/2016

OTHER PUBLICATIONS

"ITU-T G.989.2 Recommendation, 40-Gigabit-capable-passive optical networks 2(NG PON2): Physical media dependent (PMD) layer specification," Feb. 2019.
Y. Luo, et al., "Physical Layer Aspects of NG-PON2 Standards-Part 2 :System Design and Technology Feasibility [Invited]," J. Opt. Com-mun. Netw., 8(1), pp. 43-52, Jan. 2016.

* cited by examiner

*Primary Examiner* — Darren E Wolf

(57) ABSTRACT

An optical communication device that communicates with another optical communication device using at least a time division multiplexing method, the optical communication device includes: a band request unit that requests a band for transmitting a management control signal used for management and control; and a transmitting unit that transmits the management control signal as a burst signal using a band assigned to be able to transmit data having a data length or more obtained based on a transmission rate of the management control signal, a transmission rate of a main signal, and a data length of the management control signal.

7 Claims, 13 Drawing Sheets

OPTICAL COMMUNICATION DEVICE, OPTICAL ACCESS SYSTEM AND OPTICAL COMMUNICATION METHOD

CROSS-REFERENCE TO RELATED APPLICATIONS

This application is a 371 U.S. National Phase of International Application No. PCT/JP2020/043208, filed on Nov. 19, 2020. The entire disclosure of the above application is incorporated herein by reference.

TECHNICAL FIELD

The present invention relates to an optical communication device, an optical access system and an optical communication method.

BACKGROUND ART

Fiber to the home (FTTH) is spreading worldwide, and most of FTTH is provided by a TDM-passive optical network (TDM-PON) method having excellent economic efficiency. In the TDM-PON method, one optical line terminal (OLT) accommodates a plurality of optical network units (ONUs) by time division multiplexing (TDM).

FIG. 12 illustrates a configuration of a conventional TDM-PON system. As illustrated in FIG. 12, a conventional TDM-PON system 500 includes one OLT 510 and a plurality of ONUs 520. The OLT 510 and the plurality of ONUs 520 are connected to one or more optical splitters 530, 540, and 550 by optical fibers. FIG. 12 illustrates a configuration in which the optical splitter 530 is connected to the OLT 510 by an optical fiber, the optical splitters 540 and 550 are connected to the optical splitter 530 by optical fibers, respectively, and two ONUs 520 are connected to each of the optical splitters 540 and 550 by optical fibers. The plurality of ONUs 520 transmits data at transmission timings assigned from the OLT 510.

The OLT 510 includes an optical multiplexing/demultiplexing unit 511, an optical transmitting unit 512, an optical receiving unit 513, and a media access control unit 514. The optical multiplexing/demultiplexing unit 511 separates the upstream signal and the downstream signal. The optical transmitting unit 512 converts data of an electric signal to be transmitted into an optical signal. The optical receiving unit 513 converts the optical signal output from the optical multiplexing/demultiplexing unit 511 into an electric signal. In order to share an optical fiber among a plurality of ONUs 520, the media access control unit 514 schedules a transmission amount and a transmission timing for each ONU 520, and generates a gate frame. The media access control unit 514 transmits the generated gate frame to the ONU 520 via the optical transmitting unit 512.

The ONU 520 includes an optical multiplexing/demultiplexing unit 521, an optical transmitting unit 522, an optical receiving unit 523, and a media access control unit 524. The optical multiplexing/demultiplexing unit 521 separates the upstream signal and the downstream signal. The optical transmitting unit 522 converts data of an electric signal to be transmitted into an optical signal. The optical receiving unit 523 converts the optical signal output from the optical multiplexing/demultiplexing unit 521 into an electric signal. The media access control unit 524 processes the gate frame transmitted from the OLT 510 and generates a report frame for requesting a band from the OLT 510. The ONU 520 ascertains the data transmission timing from the information of the transmission timing included in the gate frame, and transmits the data at the assigned transmission timing.

On the other hand, in the International Telecommunication Union Telecommunication Standardization sector (ITU-T) G. 989.2 Recommendation, a PON system that performs wavelength multiplexing called point to point wavelength division multiplexing-PON (PtP WDM-PON) is defined (for example, refer to Non Patent Literature 1). In the PtP WDM-PON system, communication is performed using different wavelengths for each ONU in an uplink direction that is a direction from the ONU to the OLT and a downlink direction that is a direction from the OLT to the ONU.

As described in Non Patent Literature 1, in the PtP WDM-PON system, a management control signal called an auxiliary management and control channel (AMCC) is used as a signal for management and control used between the OLT and the ONU. The AMCC signal is a signal that is transmitted by being superimposed on a main signal after information to be transmitted is modulated by a predetermined method. When the AMCC signal is superimposed on the main signal and transmitted, the OLT and the ONU can transmit a signal for management and control within a wavelength range of a wavelength used in the main signal. That is, management and control can be realized without using a dedicated wavelength range for management and control. When the AMCC signal is used for management and control, in the PtP WDM-PON system, a wavelength determining process in which an uplink wavelength and a downlink wavelength are determined is implemented by using the AMCC signal.

According to Non Patent Literature 1, there are two types of methods for superimposing the AMCC signal. A first method "baseband modulation" is a method of superimposing an AMCC signal on a main signal by a baseband signal on a transmitter (for example, the ONU) side. In the superimposition method of "baseband modulation", the AMCC signal is separated by a filter such as a low-pass filter (LPF) on the receiver (for example, the OLT) side.

A second method "low-frequency pilot tone" is a method of up-converting the AMCC signal to a certain carrier frequency and superimposing the AMCC signal on the main signal on the transmitter side. In the superimposition method of "low-frequency pilot tone", the AMCC signal is acquired by performing demodulation by signal processing or the like on the receiver side.

FIG. 13 illustrates a configuration of the PtP WDM-PON system using "low-frequency pilot tone". As illustrated in FIG. 13, a conventional PtP WDM-PON system 600 includes a plurality of OLTs 610 and a plurality of ONUs 620. The plurality of OLTs 610 and the plurality of ONUs 620 are connected to a wavelength demultiplexing unit 630 and an optical splitter 640 by optical fibers. FIG. 13 illustrates a configuration in which the wavelength demultiplexing unit 630 is connected to the OLT 610 by an optical fiber, the optical splitter 640 is connected to the wavelength demultiplexing unit 630 by an optical fiber, and the ONUs 520 are connected to the optical splitter 640 by optical fibers. As described above, the plurality of OLTs 610 performs communication using different wavelengths for each ONU 620 in the uplink direction and the downlink direction.

Each OLT 610 accommodates a different ONU 620 and processes an optical signal demultiplexed and input by the wavelength demultiplexing unit 630.

The OLT 610 includes an optical multiplexing/demultiplexing unit 611, an optical transmitting unit 612, a management control unit 613, and an optical receiving unit 614. The optical multiplexing/demultiplexing unit 611 separates the upstream signal and the downstream signal. The optical transmitting unit 612 converts data of an electric signal to be transmitted into an optical signal. The management control unit 613 superimposes the AMCC signal on the main signal at the electrical stage or acquires the AMCC signal at the electrical stage. The optical receiving unit 614 converts the optical signal output from the optical multiplexing/demultiplexing unit 611 into an electric signal.

The ONU 620 includes an optical multiplexing/demultiplexing unit 621, an optical transmitting unit 622, a management control unit 623, and an optical receiving unit 624. The optical multiplexing/demultiplexing unit 621 separates the upstream signal and the downstream signal. The optical transmitting unit 622 converts data of an electric signal to be transmitted into an optical signal. The management control unit 623 superimposes the AMCC signal on the main signal at the electrical stage or acquires the AMCC signal at the electrical stage. The optical receiving unit 624 converts the optical signal output from the optical multiplexing/demultiplexing unit 621 into an electric signal.

CITATION LIST

Non Patent Literature

Non Patent Literature 1: "ITU-T G. 989.2 Recommendation, "40-Gigabit-capable-passive optical networks (NG-PON2): Physical media dependent (PMD) layer specification," February 2019.

Non Patent Literature 2: Y. Luo, H. Roberts, K. Grobe, M. Valvo, D. Nesset, K. Asaka, H. Rohde, J. Smith, J. S. Wey, and F. Effenberger, "Physical Layer Aspects of G-PON2 Standards-Part 2: System Design and Technology Feasibility", J. Opt. Com-mun. Netw., 8(1), pp. 43-52, January 2016.

SUMMARY OF INVENTION

Technical Problem

When the AMCC signal can be used for TDM-PON, a signal for management and control can be transmitted within the wavelength range of the wavelength used for the main signal, and thus it is not necessary to use a dedicated optical wavelength range. Furthermore, it is not necessary to embed a signal for management and control in the main signal, and transmission efficiency of the main signal can be increased. The AMCC signal is a low-speed signal on the order of kb/s (kilo bit/sec) (for example, refer to Non Patent Literature 2). On the other hand, the TDM-PON signal is a high-speed signal on the order of Gb/s (Giga bit/sec). In the uplink direction of the TDM-PON, burst signals for controlling transmission timings such that frames from each ONU do not collide are exchanged between the OLT and the ONU. The frame length of the low-speed AMCC signal is expected to be significantly longer than the frame length of the high-speed burst signal, and it has been difficult to superimpose the AMCC signal as the management control signal on the burst signal. Therefore, there is a problem that the management control signal cannot be used in the TDM-PON. Such a problem is not limited to TDM-PON, and is a problem common to at least general systems in which time division multiplexing is performed.

In view of the above circumstances, an object of the present invention is to provide a technique capable of using a management control signal in a system in which time division multiplexing is performed.

Solution to Problem

According to an aspect of the present invention, there is provided an optical communication device that communicates with another optical communication device using at least a time division multiplexing method, the optical communication device including: a band request unit that requests a band for transmitting a management control signal used for management and control; and a transmitting unit that transmits the management control signal as a burst signal using a band assigned to be able to transmit data having a data length or more obtained based on a transmission rate of the management control signal, a transmission rate of a main signal, and a data length of the management control signal.

According to another aspect of the present invention, there is provided an optical communication device that communicates with another optical communication device using at least a time division multiplexing method, the optical communication device including: a size calculation unit that converts a data length of a management control signal into a data length of a main signal based on a transmission rate of the management control signal used for management and control, a transmission rate of the main signal, and the data length of the management control signal; a comparison unit that compares the data length of the main signal converted by the size calculation unit with the data length of the main signal accumulated in a buffer of the other optical communication device; and a gate frame generation unit that determines a band to be assigned to the other optical communication device according to a comparison result of the comparison unit, and transmits a gate frame including information of an assigned amount of the determined band to the other optical communication device.

According to still another aspect of the present invention, there is provided an optical access system that performs communication between a first optical communication device and a second optical communication device using at least a time division multiplexing method, in which the first optical communication device includes a band request unit that requests a band for transmitting a management control signal used for management and control, and a transmitting unit that transmits the management control signal as a burst signal using a band assigned to be able to transmit data having a data length or more obtained based on a transmission rate of the management control signal, a transmission rate of a main signal, and a data length of the management control signal, and the second optical communication device includes a band assignment unit that assigns a band requested by the first optical communication device.

According to still another aspect of the present invention, there is provided an optical communication method performed by an optical communication device that performs communication with another optical communication device using at least a time division multiplexing method, the optical communication method including: requesting a band for transmitting a management control signal used for management and control; and transmitting the management control signal as a burst signal using a band assigned to be able to transmit data having a data length or more obtained based on a transmission rate of the management control signal, a transmission rate of a main signal, and a data length of the management control signal.

Advantageous Effects of Invention

According to the present invention, a management control signal can be used in a system in which time division multiplexing is performed.

DESCRIPTION OF EMBODIMENTS

Hereinafter, an embodiment of the present invention will be described in detail with reference to drawings.

(Overview)

In an optical access system according to the present invention, as an example, in TDM-PON, when transmitting an AMCC signal by superimposing the AMCC signal on an uplink burst signal that is a main signal or transmitting an AMCC signal without the main signal, an ONU requests assignment of a band in which the AMCC signal can be transmitted. Specifically, first, in the ONU or the OLT, the data length of the AMCC signal is converted into the data length of the main signal based on the transmission rate of each of the AMCC signal and the main signal and the data length of the AMCC signal. Hereinafter, a value obtained by converting the data length of the AMCC signal into the data length of the main signal is referred to as a converted data length. Next, the ONU or the OLT compares the data length of the main signal with the converted data length, and determines the longer one as the data length (hereinafter, referred to as a "necessary data size") necessary for transmission of the AMCC signal. Then, when the necessary data size is determined by the ONU, the ONU notifies the OLT of the determined necessary data size in the report frame. When the necessary data size is determined by the OLT, the OLT assigns the transmission amount and the transmission timing to the ONU according to the determined necessary data size. As a result, the AMCC signal can be transmitted in the TDM-PON. As a result, the AMCC signal can be used in the TDM-PON.

Details will be described below.

First Embodiment

Figure 1:
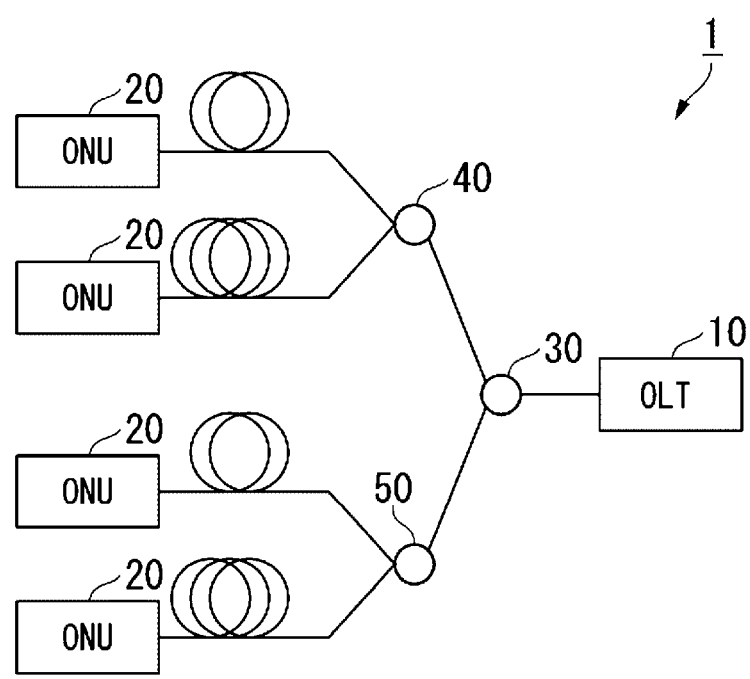
FIG. 1 is a diagram illustrating a configuration example of an optical access system according to a first embodiment.

FIG. 1 is a diagram illustrating a configuration example of an optical access system 1 in a first embodiment.

The optical access system 1 includes an OLT 10 and one or more ONUs 20. The OLT 10 and the ONU 20 are connected to one or more optical splitters 30, 40, and 50 by optical fibers. FIG. 1 illustrates a configuration in which the optical splitter 30 is connected to the OLT 10 by an optical fiber, the optical splitters 40 and 50 are connected to the optical splitter 30 by optical fibers, respectively, and two ONUs 20 are connected to each of the optical splitters 40 and 50 by optical fibers. Hereinafter, a direction from the OLT 10 to the ONU 20 is referred to as a downlink direction, and a direction from the ONU 20 to the OLT 10 is referred to as an uplink direction.

The configuration illustrated in FIG. 1 is an example, and the number of ONUs 10, ONUs 20, and optical splitters included in the optical access system 1 is not particularly limited. In the optical access system 1, it is assumed that communication is performed between the OLT 10 and the ONU 20 by the TDM-PON method. The optical access system 1 uses a "low-frequency pilot tone" that superimposes the AMCC signal on the main signal at the electrical stage.

The OLT 10 performs band assignment for the ONU 20. Specifically, the OLT 10 assigns a data transmission timing and a data transmission amount for each ONU 20. The data transmission timing indicates a timing at which the OLT 10 starts transmission of the main signal. The transmission amount represents the data amount that can be transmitted by the OLT 10 in one transmission.

The ONU 20 performs data transmission to the OLT 10 based on the transmission timing and the transmission amount assigned from the OLT 10. The ONU 20 generates an AMCC signal to be transmitted to the OLT 10, and requests the OLT 10 to assign a transmission amount with which the generated AMCC signal can be transmitted.

The optical splitter 30 branches the optical signal transmitted from the OLT 10 and outputs the optical signal to the optical splitters 40 and 50. The optical splitter 30 outputs the optical signals output from the optical splitters 40 and 50 to the OLT 10.

The optical splitters 40 and 50 output the optical signal transmitted from the OLT 10 to the optical splitter 30. The optical splitters 40 and 50 branch the optical signal output from the optical splitter 30 and output the optical signal to the ONU 20.

Figure 2:
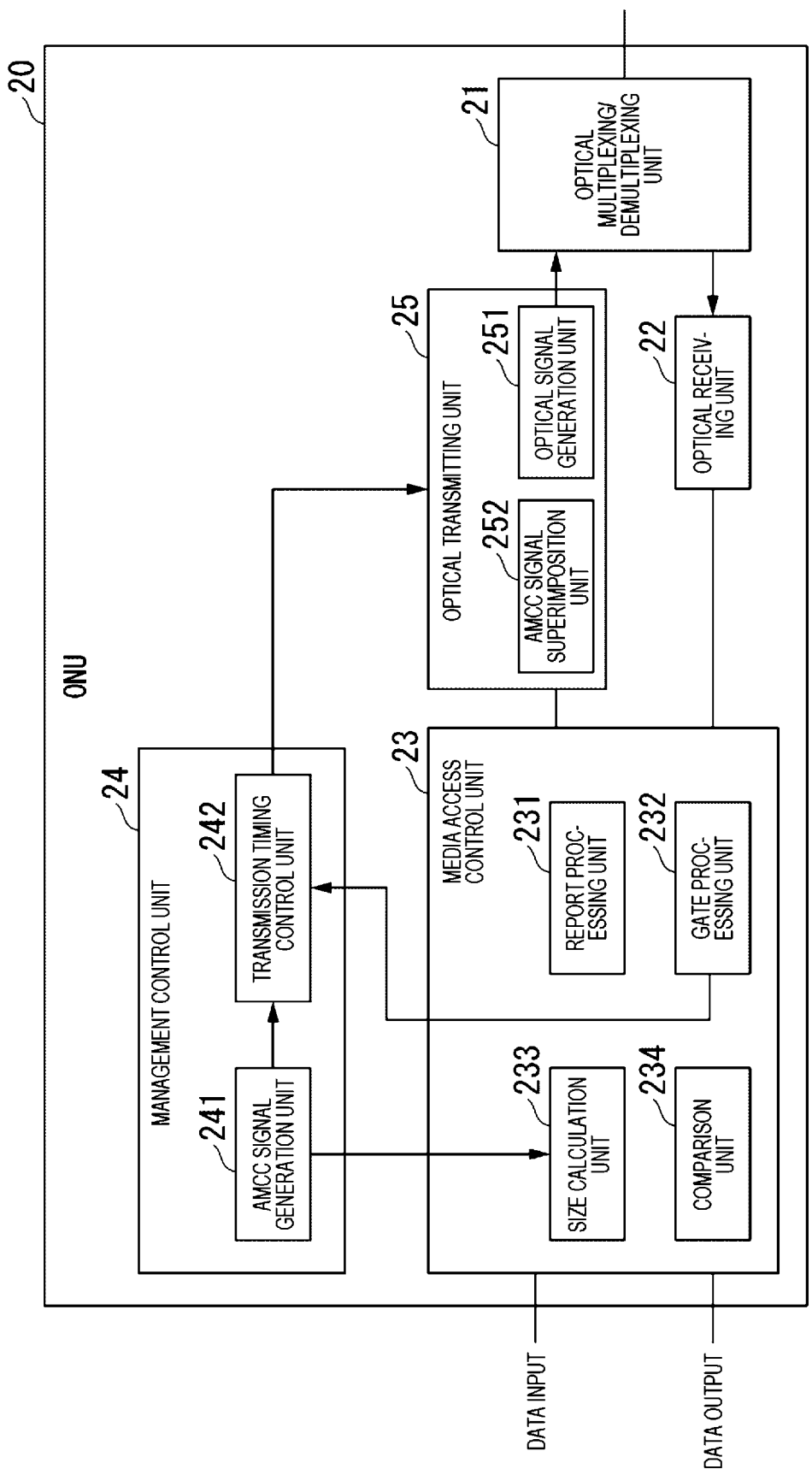
FIG. 2 is a diagram illustrating a configuration of an ONU according to the first embodiment.

FIG. 2 is a diagram illustrating a configuration of the ONU 20 according to the first embodiment.

The ONU 20 includes an optical multiplexing/demultiplexing unit 21, an optical receiving unit 22, a media access control unit 23, a management control unit 24, and an optical transmitting unit (transmitter) 25.

The optical multiplexing/demultiplexing unit 21 separates the upstream signal and the downstream signal.

The optical receiving unit 22 includes an optical/electrical (O/E) converter such as a photodetector therein. The optical receiving unit 22 receives an optical signal via the optical multiplexing/demultiplexing unit 21, converts the received optical signal into an electric signal by the O/E converter, and outputs the electric signal to the media access control unit 23. The optical receiving unit 22 receives a gate frame transmitted from the OLT 10, for example. The gate frame includes an instruction of a transmission timing and a transmission amount such that the plurality of ONUs 20 can transmit data without time collision.

The media access control unit 23 processes at least the gate frame transmitted from the OLT 10 and generates a report frame for requesting a band from the OLT 10. The media access control unit 23 includes a report processing unit (band requestor) 231, a gate processing unit 232, a size calculation unit (size calculator) 233, and a comparison unit (comparator) 234.

The report processing unit 231 generates a report frame. The report frame is used to notify the OLT 10 of the data amount waiting for transmission accumulated in the buffer of the ONU 20 and to notify the OLT 10 of a necessary data size.

The gate processing unit 232 acquires information on the transmission timing and the transmission amount included in the gate frame. The gate processing unit 232 outputs information on the acquired transmission timing and transmission amount to the management control unit 24. Here, for the sake of simplicity, the transmission amount does not include the transmission amount of the main signal including an inter frame gap (IFG). Furthermore, the transmission timing does not include a time required for turning on or off the laser included in the optical transmitting unit 25 and a time required for automatic gain control (AGC) and clock data recovery (CDR) in the optical receiving unit 22.

The size calculation unit 233 calculates the converted data length based on the transmission rates of each of the AMCC signal and the main signal and the data length of the AMCC signal.

The comparison unit 234 compares the converted data length calculated by the size calculation unit 233 with the data length of the main signal accumulated in the buffer. When there is no main signal accumulated in the buffer, the data length of the main signal accumulated in the buffer is set to 0. As a result of the comparison, the comparison unit 234 determines that the information on the longer data length is the necessary data size.

The management control unit 24 includes an AMCC signal generation unit 241 and a transmission timing control unit 242.

The AMCC signal generation unit 241 generates an AMCC signal. Items to be managed and controlled by the AMCC signal are control information, monitoring information, and the like of a transmission wavelength defined in ITU-T G. 989.2 Recommendation. The AMCC signal generation unit 241 outputs information on the data length of the AMCC signal to the size calculation unit 233.

The transmission timing control unit 242 acquires information on the transmission timing output from the gate processing unit 232. The transmission timing control unit 242 controls the optical transmitting unit 25 to perform transmission at the burst signal transmission start time based on the acquired information on the transmission timing. The transmission timing control unit 242 outputs the AMCC signal generated by the AMCC signal generation unit 241 to the optical transmitting unit 25.

The optical transmitting unit 25 transmits an optical signal to the outside under the control of the transmission timing control unit 242. The optical transmitting unit 25 includes an optical signal generation unit 251 and an AMCC signal superimposition unit 252.

The optical signal generation unit 251 includes a light source that emits light for data transmission therein. For example, the optical signal generation unit 251 modulates light emitted from a light source provided inside based on an electric signal of a main signal on which an AMCC signal is superimposed by the AMCC signal superimposition unit 252 to convert the light into an upstream optical signal (burst signal), and sends the converted upstream optical signal to an optical fiber.

The AMCC signal superimposition unit 252 superimposes the AMCC signal on the main signal. The AMCC signal superimposition unit 252 outputs the main signal on which the AMCC signal is superimposed to the optical signal generation unit 251. In this manner, the AMCC signal superimposition unit 252 superimposes the AMCC signal on the main signal at the electrical stage.

Figure 3:
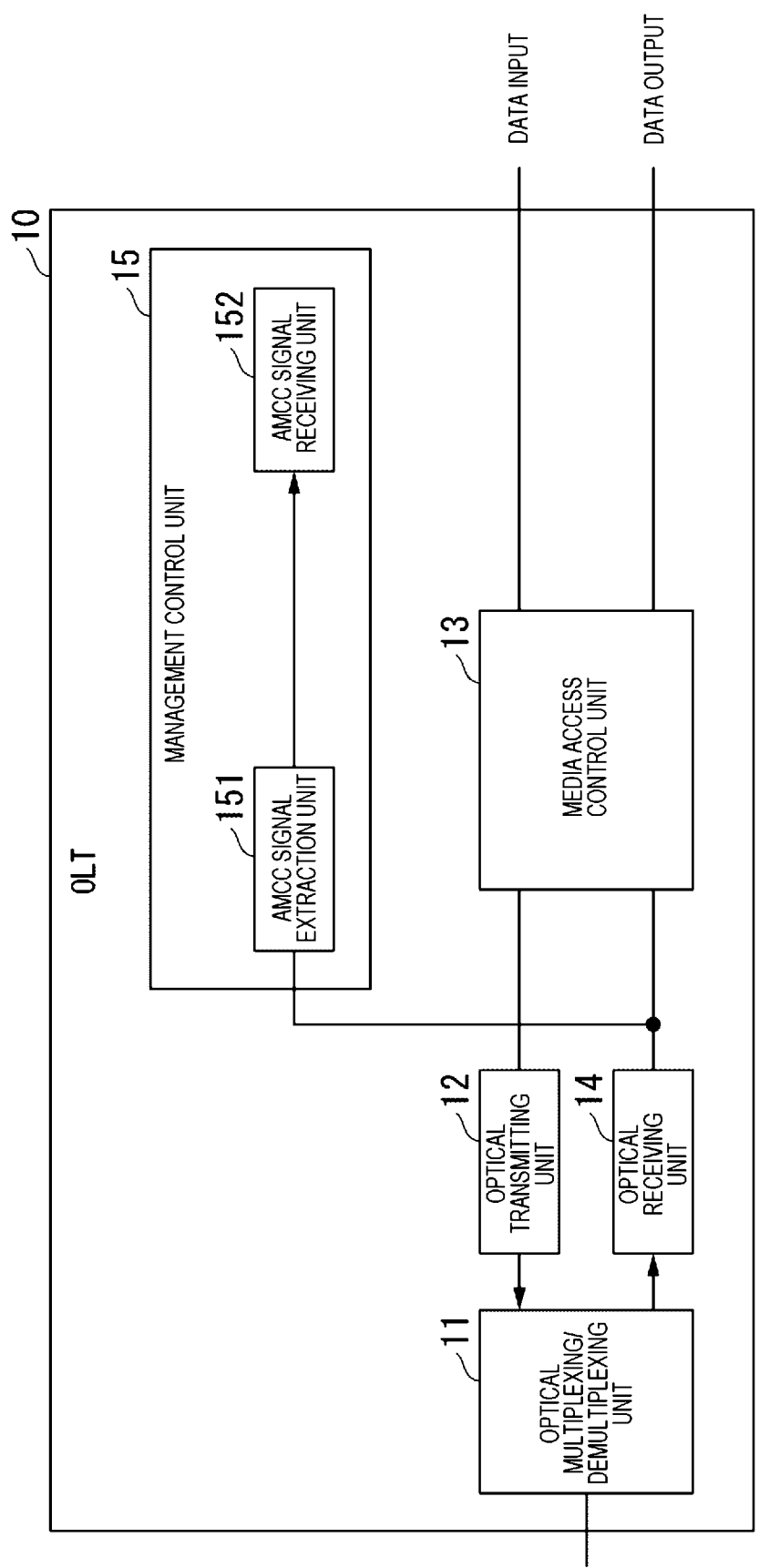
FIG. 3 is a diagram illustrating a configuration of an OLT according to the first embodiment.

FIG. 3 is a diagram illustrating a configuration of the OLT 10 according to the first embodiment.

The OLT 10 includes an optical multiplexing/demultiplexing unit 11, an optical transmitting unit 12, a media access control unit 13, an optical receiving unit 14, and a management control unit 15.

The optical multiplexing/demultiplexing unit 11 separates the upstream signal and the downstream signal.

The optical transmitting unit 12 includes a light source that emits light for data transmission therein. The optical transmitting unit 12 modulates light emitted from a light source provided inside based on an electric signal of a main signal to convert the light into an optical signal, and sends the converted optical signal to an optical fiber.

The media access control unit 13 schedules a transmission timing and a transmission amount for each OLT 10 based on the report frame transmitted from the ONU 20, and generates a gate frame.

The optical receiving unit 14 includes the O/E converter such as a photodetector therein. The optical receiving unit 14 receives an optical signal via the optical multiplexing/demultiplexing unit 11, converts the received optical signal into an electric signal by the O/E converter, and outputs the electric signal to the media access control unit 23 and the management control unit 15. The optical receiving unit 14 receives, for example, an optical signal on which a report frame and a divided AMCC signal transmitted from the ONU 20 are superimposed.

The management control unit 15 performs processing related to acquisition of the AMCC signal. The management control unit 15 includes an AMCC signal extraction unit 151 and an AMCC signal receiving unit 152.

The AMCC signal extraction unit 151 acquires the AMCC signal by signal processing or the like. For example, the AMCC signal extraction unit 151 demodulates the AMCC signal superimposed on the main signal to acquire the AMCC signal.

The AMCC signal receiving unit 152 performs management and control based on the AMCC signal demodulated by the AMCC signal extraction unit 151.

Figure 4:
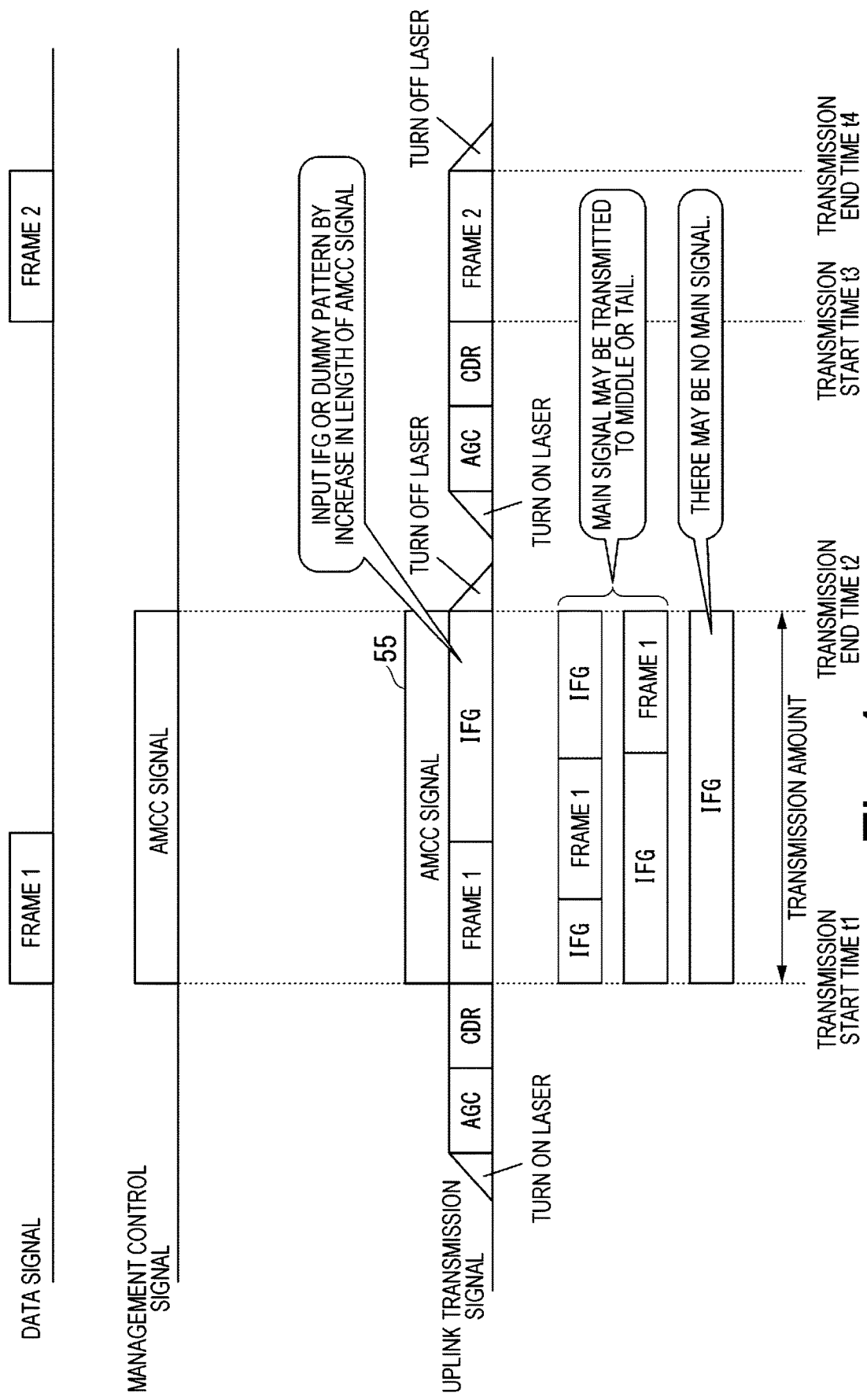
FIG. 4 is a diagram for explaining processing for transmitting an AMCC signal according to the first embodiment.

FIG. 4 is a diagram for explaining processing for transmitting the AMCC signal according to the first embodiment.

FIG. 4 illustrates a case where the ONU 20 transmits the main signals of a frame 1 and a frame 2. The ONU 20 transmits the frame 1 at a first transmission timing between time t1 and time t2, and transmits the frame 2 at a second transmission timing between time t3 and time t4. Note that, in describing FIG. 4, it is assumed that a transmission amount with which the AMCC signal can be transmitted by the processing of the size calculation unit 233 and the comparison unit 234 is assigned from the OLT 10 to the ONU 20. As illustrated in FIG. 4, the AMCC signal 55 has a data length larger than that of the frame 1 which is the main signal. In this case, the ONU 20 inserts the IFG or the dummy pattern by the difference between the data length of the AMCC signal 55 and the data length of the frame 1. Note that the position of the main signal at the time of inserting the IFG or the dummy pattern does not need to be at the head, and may be disposed at the middle or the tail. Note that, in a case where there is no main signal and only the AMCC signal is transmitted, the ONU 20 may provide an IFG corresponding to the data length of the AMCC signal and transmit only the AMCC signal, or may generate a dummy pattern corresponding to the data length of the AMCC signal, superimpose the AMCC signal on the generated dummy pattern to transmit the AMCC signal.

Before time t1, the ONU 20 turns on the laser of the optical transmitting unit 25 to perform AGC and CDR processing, and superimposes the AMCC signal 55 on the frame 1. At time t1, the ONU 20 sends an optical signal obtained by superimposing the AMCC signal 55 on the main signal of the frame 1. Thereafter, the ONU 20 once turns off the laser and waits until the next transmission timing (for example, transmission start time t3). Before time t3, the ONU 20 turns on the laser of the optical transmitting unit 25 and performs AGC and CDR processing. Since there is no AMCC signal at the timing of the transmission start time t3, the ONU 20 converts the main signal of the frame 2 into an optical signal and transmits the converted optical signal. Thereafter, the ONU 20 once turns off the laser and waits until the next transmission timing.

As described above, the ONU 20 inserts the IFG or the dummy pattern into the frame of the main signal to increase the data length of the frame such that the AMCC signal can be transmitted. Then, the ONU 20 superimposes the AMCC signal on the enlarged frame.

Figure 5:
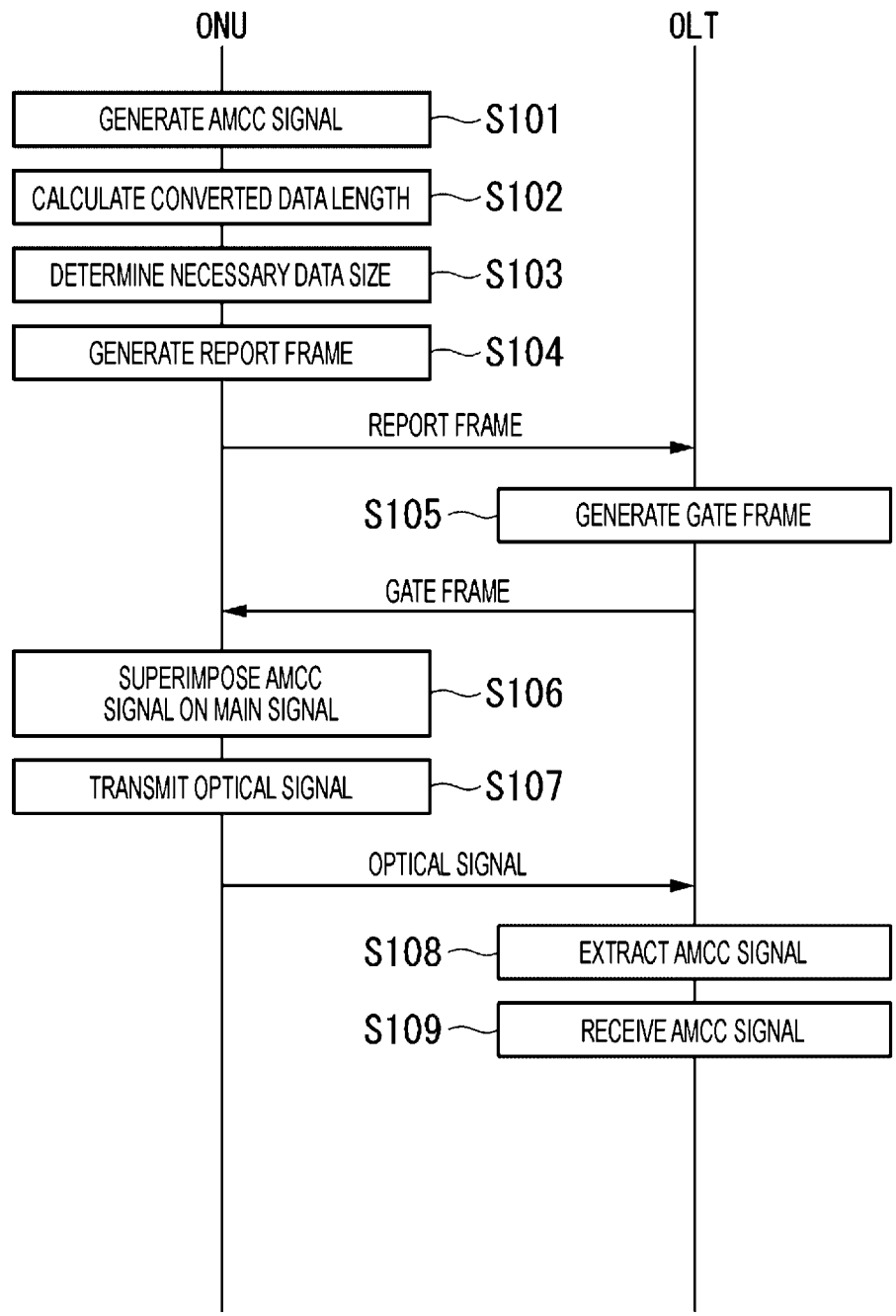
FIG. 5 is a sequence diagram illustrating a processing flow of the optical access system according to the first embodiment.

FIG. 5 is a sequence diagram illustrating the processing flow of the optical access system 1 according to the first embodiment. At the start of the processing of FIG. 5, it is assumed that data to be transmitted is accumulated in a buffer in the ONU 20. In the processing of FIG. 5, the optical splitter will not be described.

The AMCC signal generation unit 241 generates the AMCC signal (step S101). The AMCC signal generation unit 241 outputs the generated AMCC signal to the transmission timing control unit 242, and outputs information on the data length of the AMCC signal to the size calculation unit 233. The size calculation unit 233 calculates the converted data length based on the following formula (1) using the transmission rates of each of the AMCC signal and the main signal and the information on the data length of the AMCC signal output from the AMCC signal generation unit 241 (step S102).

[Math. 1]

$$\text{Converted data length} = \frac{\text{AMCC signal data length [byte]} \times 8}{\text{AMCC signal transmission rate [bit/s]}} \times \text{Main signal transmission rate [bit/}x\text{]} \quad \text{Formula (1)}$$

The converted data length calculated in Formula (1) is not the data length of the main signal accumulated in the buffer but the data length with which the AMCC signal can be transmitted. Therefore, the converted data length calculated in Formula (1) may be equal to or larger than the size of the AMCC signal. The size calculation unit 233 outputs information on the calculated converted data length to the comparison unit 234. The comparison unit 234 compares the converted data length output from the size calculation unit 233 with the data length of the main signal accumulated in the buffer, and determines the necessary data size (step S103). The comparison unit 234 determines the longer data length as the necessary data size. The comparison unit 234 outputs the determination result to the report processing unit 231.

The report processing unit 231 generates a report frame based on the determination result output from the comparison unit 234 (step S104). The report frame generated by the report processing unit 231 includes information on the necessary data size. The report processing unit 231 outputs the generated report frame to the optical transmitting unit 25. The optical signal generation unit 251 of the optical transmitting unit 25 converts the report frame into an optical signal and transmits the optical signal to the OLT 10. At this point, the AMCC signal superimposition unit 252 does not perform the processing because the AMCC signal does not need to be superimposed.

The optical multiplexing/demultiplexing unit 11 of the OLT 10 outputs the upstream optical signal input via the optical fiber to the optical receiving unit 14. The optical receiving unit 14 converts the optical signal input via the optical multiplexing/demultiplexing unit 11 into an electric signal and outputs the electric signal to the media access control unit 13. The media access control unit 13 schedules the transmission timing and the transmission amount based on the report frame, and generates a gate frame including information on the assigned transmission timing and transmission amount (step S105). The media access control unit 13 outputs the generated gate frame to the optical transmitting unit 12. The optical transmitting unit 12 converts the gate frame into an optical signal and transmits the optical signal to the ONU 20.

The optical multiplexing/demultiplexing unit 21 of the ONU 20 outputs the downlink optical signal input via the optical fiber to the optical receiving unit 22. The optical receiving unit 22 converts the optical signal input via the optical multiplexing/demultiplexing unit 21 into an electric signal and outputs the electric signal to the media access control unit 23. Note that, in a case where the optical signal is not addressed to the host device, the optical receiving unit 22 discards the input optical signal. The gate processing unit 232 acquires the gate frame of the electric signal output from the optical receiving unit 22. The gate processing unit 232 outputs the acquired information on the transmission amount and information on the transmission timing included in the gate frame to transmission timing control unit 242.

The transmission timing control unit 242 may determine whether the transmission amount is a transmission amount with which the AMCC signal can be transmitted with reference to the information on the transmission amount. When the assigned transmission amount is a transmission amount with which the AMCC signal can be transmitted, the transmission timing control unit 242 controls the optical transmitting unit 25 to superimpose the AMCC signal on the main signal at the assigned transmission timing. On the other hand, when the assigned transmission amount is not the transmission amount with which the AMCC signal can be transmitted, the transmission timing control unit 242 may cause the report processing unit 231 to retransmit the report frame every predetermined time elapses.

The transmission timing control unit 242 controls the optical transmitting unit 25 based on the acquired information on the transmission timing to superimpose the AMCC signal on the main signal. The AMCC signal superimposition unit 252 superimposes the AMCC signal on the main signal under the control of the transmission timing control unit 242 (step S106). The main signal on which the AMCC signal is superimposed is input to the optical signal generation unit 251. The optical signal generation unit 251 generates an optical signal by modulating the light output from the light source with the main signal on which the AMCC signal is superimposed. The optical signal generation unit 251 transmits the generated optical signal to the OLT 10 (step S107).

The optical multiplexing/demultiplexing unit 11 of the ONU 20 outputs the downlink optical signal input via the optical fiber to the optical receiving unit 14. The optical receiving unit 14 converts the optical signal input via the optical multiplexing/demultiplexing unit 11 into an electric signal. The AMCC signal extraction unit 151 extracts the AMCC signal from the electric signal converted by the optical receiving unit 14 (step S108). The AMCC signal extraction unit 151 outputs the extracted AMCC signal to the AMCC signal receiving unit 152. The AMCC signal receiving unit 152 receives the output AMCC signal (step S109). Thereafter, the AMCC signal receiving unit 152 performs management and control based on the received AMCC signal.

According to the optical access system 1 of the first embodiment configured as described above, the AMCC signal can be used in the TDM-PON. Specifically, the ONU 20 calculates the converted data length based on the transmission rates of each of the AMCC signal and the main signal and the data length of the AMCC signal. The ONU 20 compares the calculated converted data length with the data length of the main signal accumulated in the buffer, and requests the OLT 10 to assign a band in which data having a larger data length can be transmitted. As a result, even when any one of the calculated converted data length and the data length of the main signal accumulated in the buffer is selected, a band in which the AMCC signal can be superimposed on the main signal is assigned. Therefore, the AMCC signal can be superimposed on the burst signal. Therefore, the AMCC signal can be used in the TDM-PON.

Furthermore, since the AMCC signal can be superimposed on the main signal and transmitted within the wavelength range of the wavelength used for the main signal, it is not necessary to use another light source for monitoring control. Therefore, since it is not necessary to embed a signal for management and control in the main signal, transmission efficiency of the main signal can be increased.

Second Embodiment

In the first embodiment, a configuration in which the ONU executes all processing up to determination of a necessary data size has been described. In the second embodiment, a configuration in which the OLT performs a part of processing up to determination of the necessary data size will be described. Specifically, the ONU notifies the OLT of information on the data length of the AMCC signal and the data length of the main signal accumulated in the buffer. The OLT determines the necessary data size based on the notified information.

In the second embodiment, a basic system configuration is equivalent to that of the first embodiment. Hereinafter, differences from the first embodiment will be focused and described.

Figure 6:
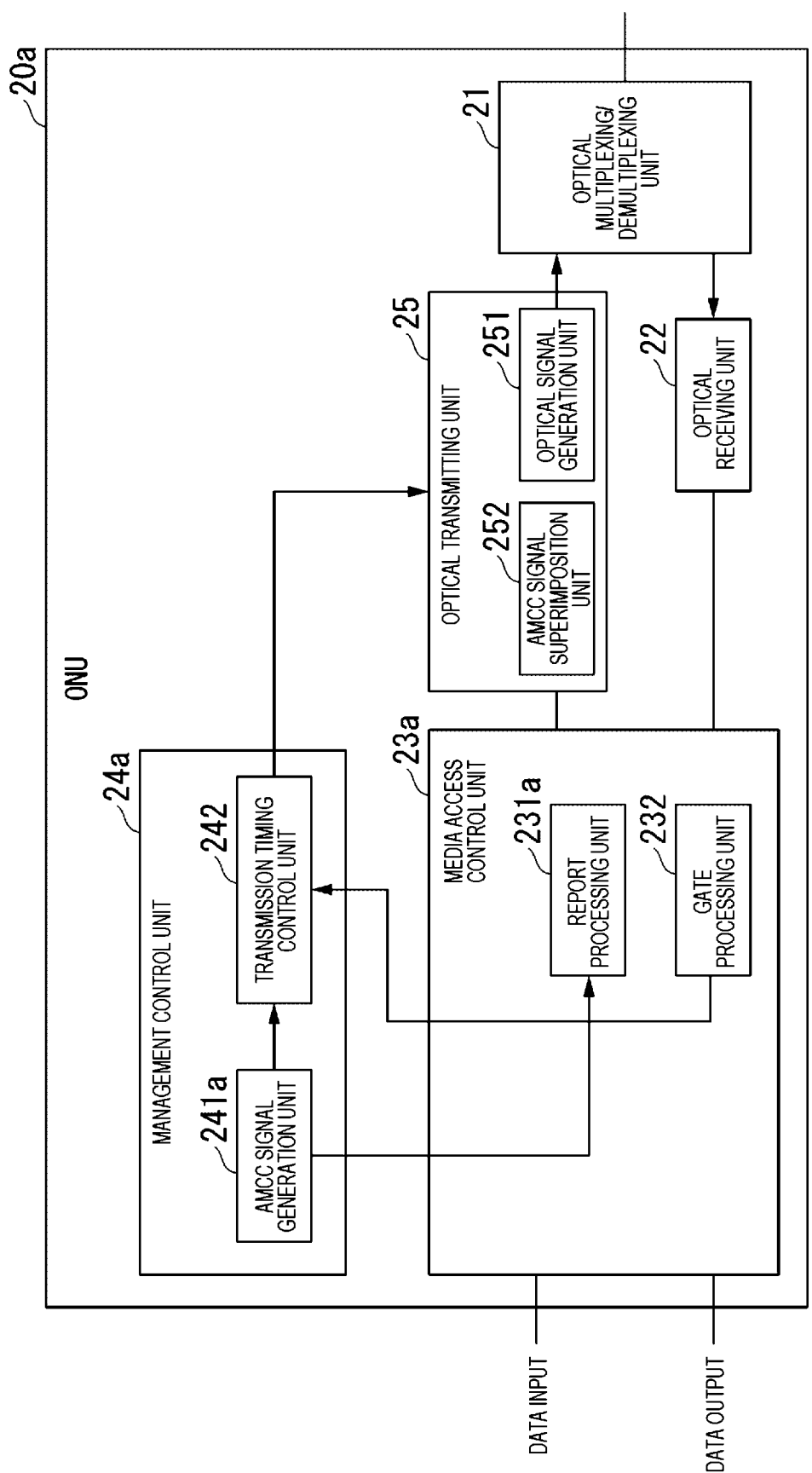
FIG. 6 is a diagram illustrating a configuration of the ONU according to a second embodiment.
Figure 7:
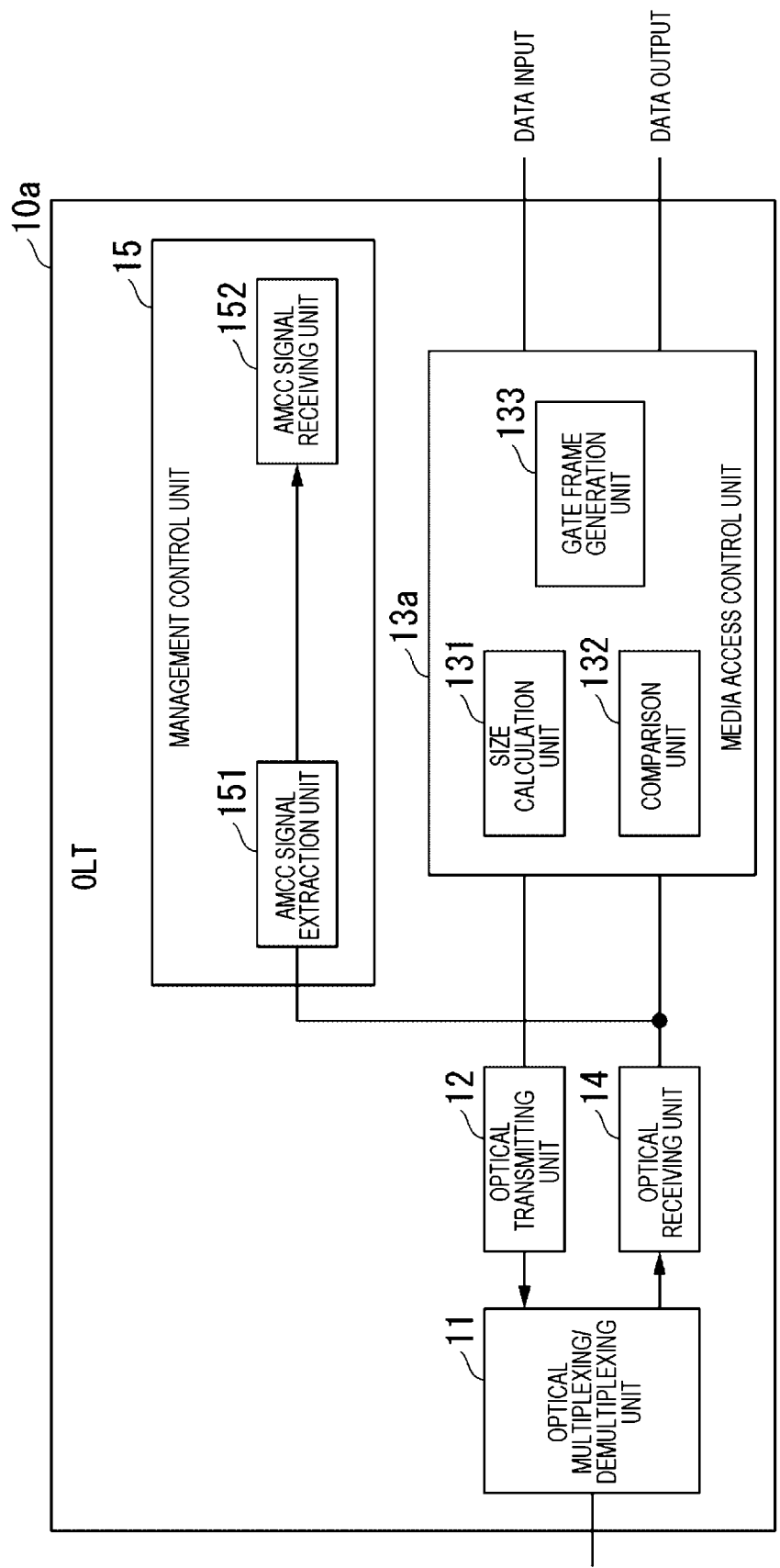
FIG. 7 is a diagram illustrating a configuration of the OLT according to the second embodiment.

FIG. 6 is a diagram illustrating a configuration of an ONU 20a according to the second embodiment.

The ONU 20a includes the optical multiplexing/demultiplexing unit 21, the optical receiving unit 22, a media access control unit 23a, a management control unit 24a, and the optical transmitting unit 25.

The configuration of the ONU 20a is different from that of the ONU 20 in that the media access control unit 23a and the management control unit 24a are provided instead of the media access control unit 23 and the management control unit 24. The ONU 20a is similar to the ONU 20 in other configurations. Therefore, the entire ONU 20a will not be described, and the media access control unit 23a and the management control unit 24a will be described.

The media access control unit 23a includes a report processing unit 231a and the gate processing unit 232.

The report processing unit 231a generates a report frame. The report processing unit 231a in the second embodiment generates a report frame including the information on the data length of the AMCC signal instructed from the AMCC signal generation unit 241a and the information on the data length of the main signal accumulated in the buffer of the ONU 10a.

The management control unit 24a includes the AMCC signal generation unit 241a and the transmission timing control unit 242.

The AMCC signal generation unit 241a generates an AMCC signal. The AMCC signal generation unit 241a outputs information on the data length of the AMCC signal to the report processing unit 231a.

FIG. 6 is a diagram illustrating a configuration of the OLT 10a according to the second embodiment.

The OLT 10a includes the optical multiplexing/demultiplexing unit 11, the optical transmitting unit 12, a media access control unit 13a, the optical receiving unit 14, and the management control unit 15.

The configuration of the OLT 10a is different from that of the OLT 10 in that the media access control unit 13a is provided instead of the media access control unit 13. The OLT 10a is similar to the OLT 10 in other configurations. Therefore, the entire OLT 10a will not be described, and the media access control unit 13a will be described.

The media access control unit 13a includes a size calculation unit (size calculator) 131, a comparison unit (comparator) 132, and a gate frame generation unit (gate frame generator, band assignor) 133.

The size calculation unit 131 calculates the converted data length based on the transmission rates of each of the AMCC signal and the main signal and the data length of the AMCC signal included in the report frame.

The comparison unit 132 compares the converted data length calculated by the size calculation unit 131 with the data length of the main signal included in the report frame. As a result of the comparison, the comparison unit 132 determines that the information on the longer data length is the necessary data size.

The gate frame generation unit 133 schedules a transmission timing and a transmission amount for each OLT 10 based on the report frame transmitted from the ONU 20a, and generates a gate frame. At this time, the gate frame generation unit 133 assigns a transmission amount satisfying the necessary data size determined by the comparison unit 132.

Figure 8:
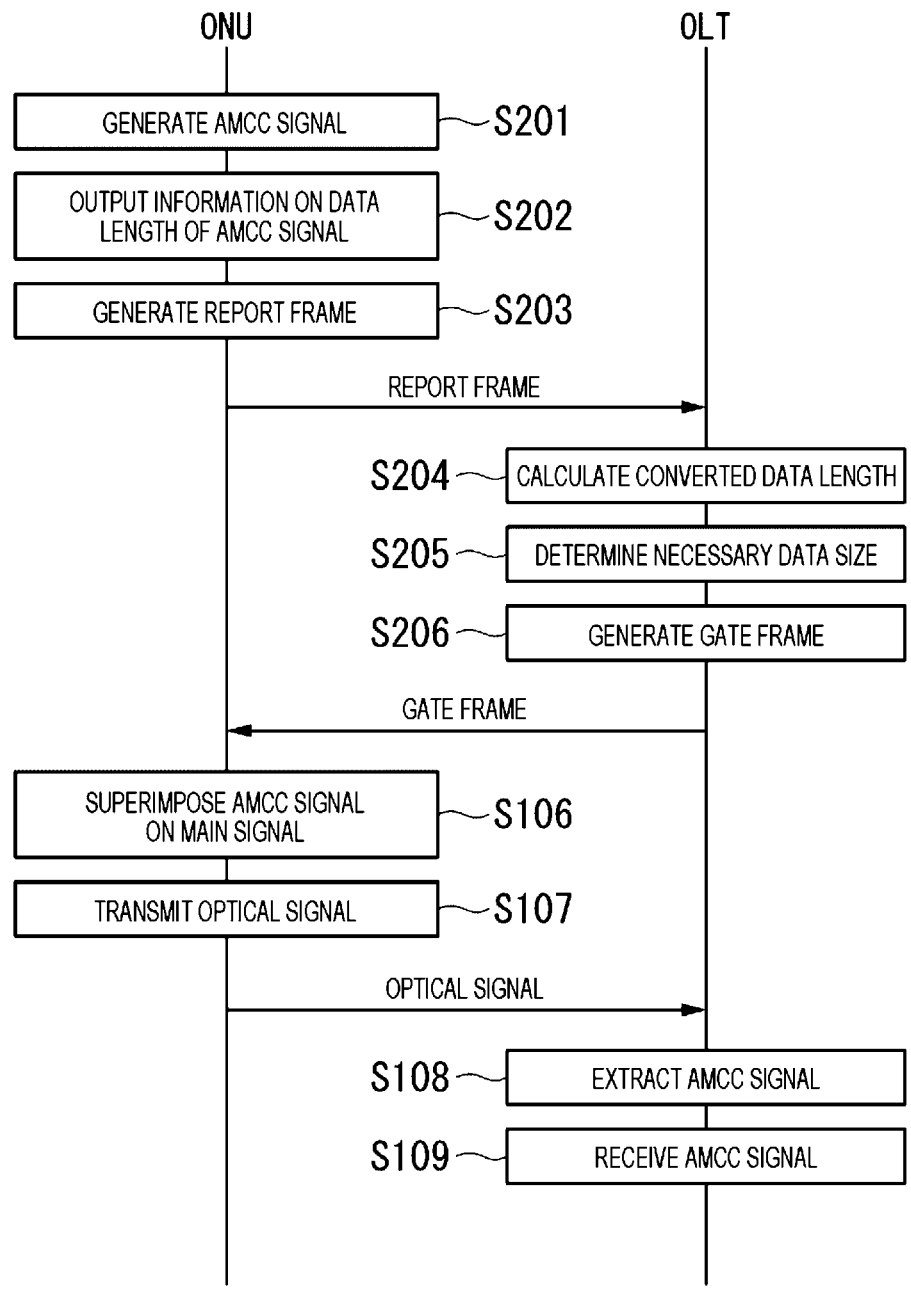
FIG. 8 is a sequence diagram illustrating a processing flow of an optical access system according to the second embodiment.

FIG. 8 is a sequence diagram illustrating the processing flow of the optical access system 1 according to the second embodiment. At the start of the processing of FIG. 8, it is assumed that data to be transmitted is accumulated in a buffer in the ONU 20a. In the processing of FIG. 8, the optical splitter will not be described. Further, in FIG. 8, the same processing steps as those in FIG. 5 is denoted by the same reference numerals as those used in FIG. 5, and explanation thereof will be omitted.

The AMCC signal generation unit 241a generates the AMCC signal (step S201). The AMCC signal generation unit 241a outputs the generated AMCC signal to the transmission timing control unit 242, and outputs information on the data length of the AMCC signal to the report processing unit 231a (step S201). In this manner, the AMCC signal generation unit 241a requests the report processing unit 231a to assign a data length necessary for transmitting the AMCC signal.

The report processing unit 231a generates a report frame including the information on the data length of the AMCC signal output from the AMCC signal generation unit 241a and the information on the data length of the main signal accumulated in the buffer (step S203). The report processing unit 231a outputs the generated report frame to the optical transmitting unit 25. The optical signal generation unit 251 of the optical transmitting unit 25 converts the report frame into an optical signal and transmits the optical signal to the OLT 10a. At this point, the AMCC signal superimposition unit 252 does not perform the processing because the AMCC signal does not need to be superimposed.

The optical multiplexing/demultiplexing unit 11 of the OLT 10a outputs the upstream optical signal input via the optical fiber to the optical receiving unit 14. The optical receiving unit 14 converts the optical signal input via the optical multiplexing/demultiplexing unit 11 into an electric signal and outputs the electric signal to the media access control unit 13a. The media access control unit 13 calculates the converted data length based on the report frame (step S204). Specifically, the size calculation unit 131 calculates the converted data length based on the above Formula (1) using the transmission rates of each of the AMCC signal and the main signal and the information on the data length of the AMCC signal included in the report frame.

The size calculation unit 131 outputs information on the calculated converted data length to the comparison unit 132. The comparison unit 132 compares the converted data length output from the size calculation unit 131 with the data length of the main signal accumulated in the buffer, and determines the necessary data size (step S205). The comparison unit 132 determines the longer data length as the necessary data size. The comparison unit 132 outputs the determination result to the gate frame generation unit 133.

The gate frame generation unit 133 schedules the transmission timing and the transmission amount, and generates the gate frame including the information on the assigned transmission timing and transmission amount (step S206). Specifically, first, the gate frame generation unit 133 assigns a transmission amount and a transmission timing with which the data indicated by the determination result output from the comparison unit 132 can be transmitted to the OLT 10a. In addition, the gate frame generation unit 133 generates the gate frame including the information on the assigned transmission amount and transmission timing. The gate frame generation unit 133 outputs the generated gate frame to the optical transmitting unit 12. The optical transmitting unit 12 converts the gate frame into an optical signal and transmits the optical signal to the ONU 20a. Thereafter, the processing from step S106 to step S109 is executed.

With the optical access system 1 according to the second embodiment configured as described above, the same effects as those of the first embodiment can be achieved.

Furthermore, in the optical access system 1 according to the second embodiment, the functions of the size calculation unit and the comparison unit are integrated in the OLT 10a as compared with the first embodiment. As a result, the ONUs 10a that exist more than the OLT 10a do not need to have the functions of the size calculation unit and the comparison unit. Therefore, the cost of each ONU 20a can be reduced as compared with the first embodiment, and the cost of the entire system can be reduced.

Third Embodiment

In the first embodiment and the second embodiment, the AMCC signal is extracted in the OLT. In a third embodiment, a configuration in which a path that branches to another network is provided between the OLT and the ONU, and the ONU is connected to a control device positioned in the other network will be described.

Figure 9:
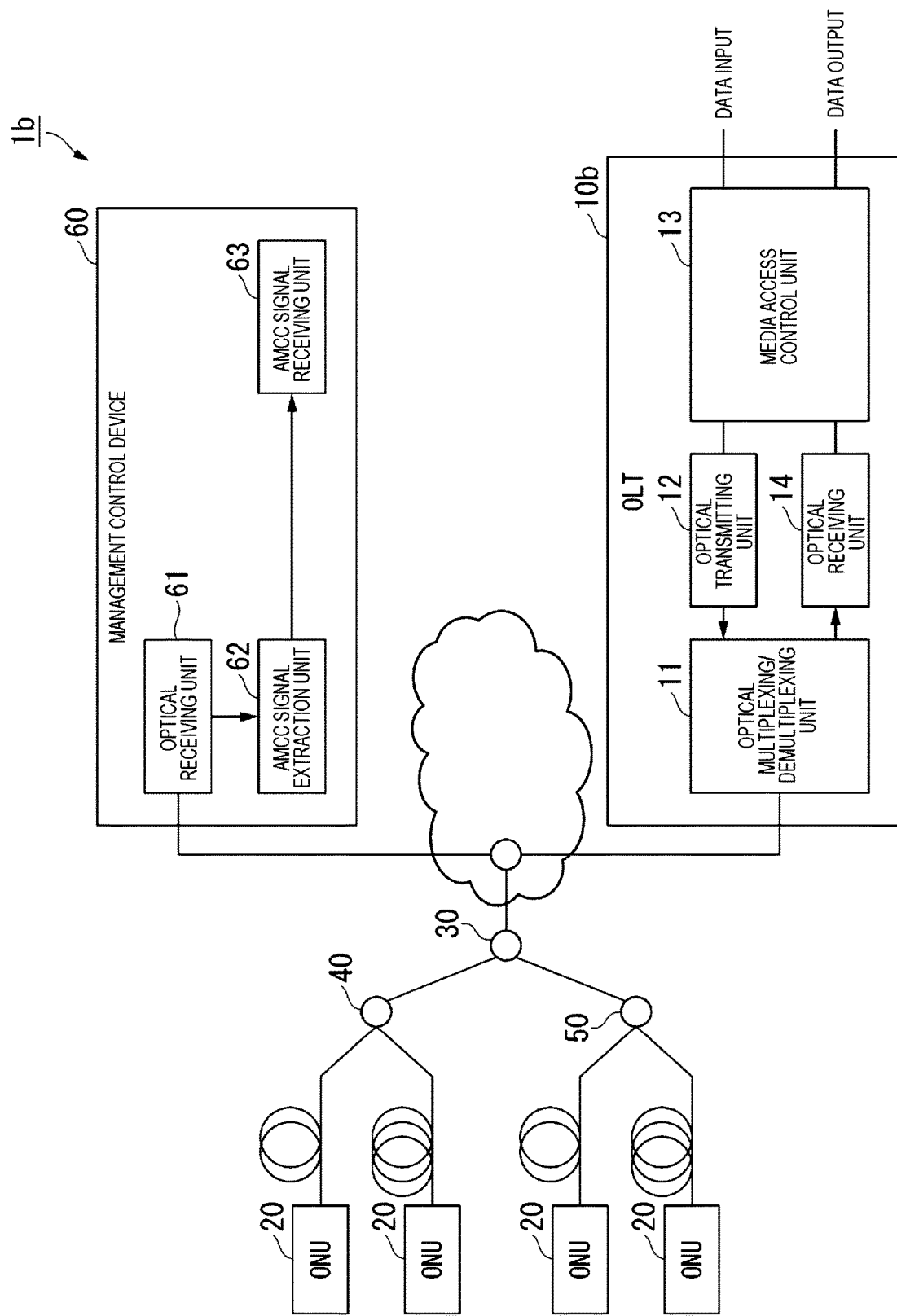
FIG. 9 is a diagram illustrating a configuration example of an optical access system according to a third embodiment.

FIG. 9 is a diagram illustrating a configuration example of an optical access system 1b in a third embodiment.

The optical access system 1b includes an OLT 10b, one or more ONUs 20, and a management control device 60. The OLT 10b, the ONU 20, and the management control device 60 are connected to one or more optical splitters 30, 40, and 50 by optical fibers. The management control device 60 is a device positioned in another network that has branched between the OLT 10 and the ONU 20. In the third embodiment, the AMCC signal is used as a management control signal of another network. For example, the AMCC signal is used for transmitting and receiving information such as an ONU-ID and issuing a warning from the ONU 20. The ONU 20 is connected to the management control device 60 via the AMCC signal.

The configuration of the OLT 10b is different from that of the OLT 10 in that the management control unit 15 is not provided, but is similar to the OLT 10 in other configurations.

The ONU 20 has a configuration similar to that of the first embodiment, but is different from that of the first embodiment in that the transmission destination of the AMCC signal is not the OLT 10b but the management control device 60.

The management control device 60 includes an optical receiving unit 61, an AMCC signal extraction unit 62, and an AMCC signal receiving unit 63.

The optical receiving unit 61 includes the O/E converter such as a photodetector therein. The optical receiving unit 61 receives an optical signal transmitted between the OLT 10 and the ONU 20, converts the received optical signal into an electric signal by the O/E converter, and outputs the electric signal to the AMCC signal extraction unit 62. The optical receiving unit 61 may receive an optical signal branched from the optical splitter provided between the OLT 10 and the ONU 20, for example.

The AMCC signal extraction unit 62 performs processing similar to that of the AMCC signal extraction unit 151.

The AMCC signal receiving unit 63 performs processing similar to that of the AMCC signal receiving unit 152.

Figure 10:
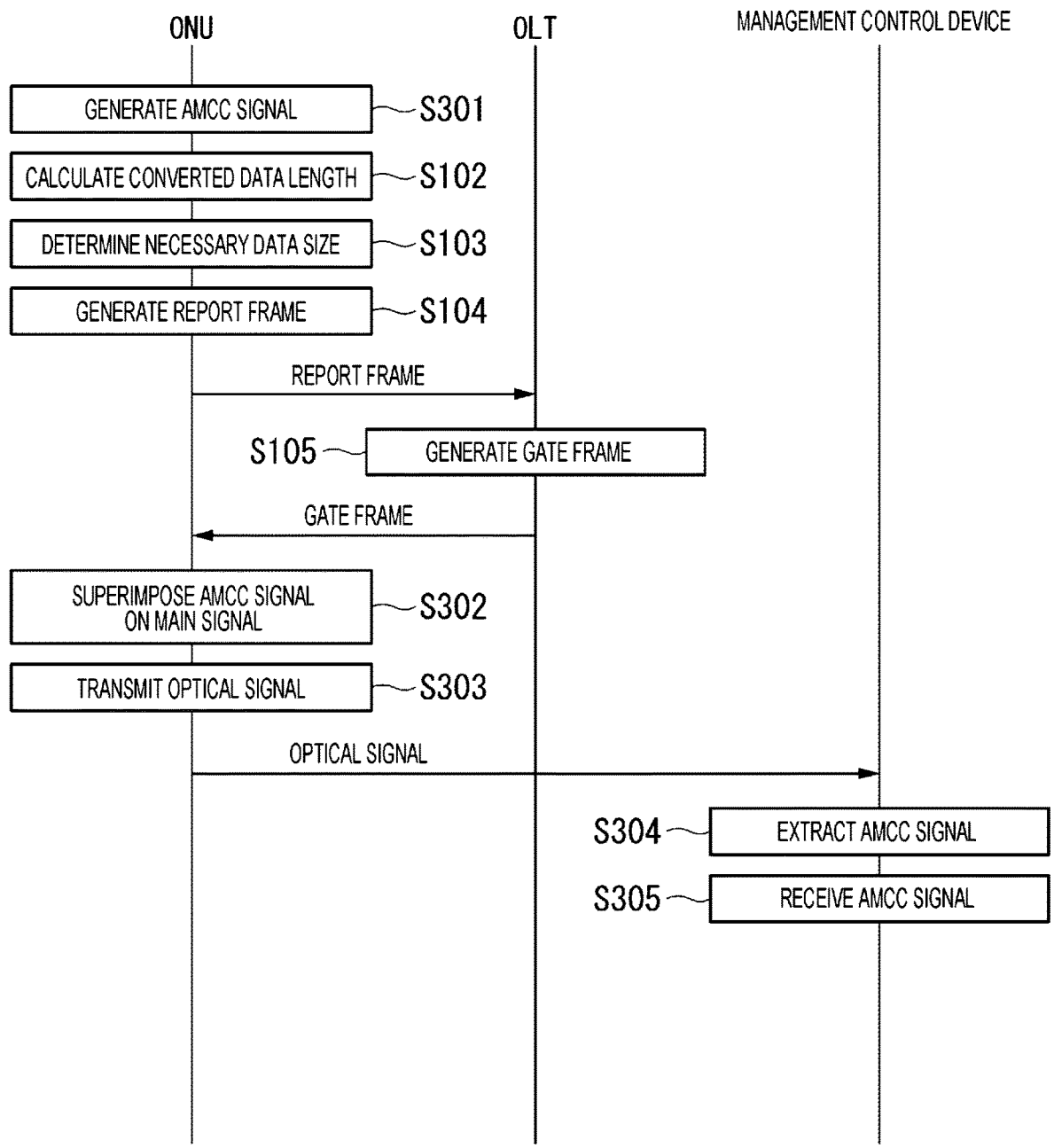
FIG. 10 is a sequence diagram illustrating a processing flow of the optical access system according to the third embodiment.

FIG. 10 is a sequence diagram illustrating the processing flow of the optical access system 1b according to the third embodiment. At the start of the processing of FIG. 10, it is assumed that data to be transmitted is accumulated in a buffer in the ONU 20. In the processing of FIG. 10, the optical splitter will not be described. Further, in FIG. 10, the same processing steps as those in FIG. 5 is denoted by the same reference numerals as those used in FIG. 5, and explanation thereof will be omitted.

The AMCC signal generation unit 241 generates the AMCC signal (step S301). At this time, the AMCC signal generation unit 241 generates an AMCC signal for exchanging signals with the management control device 60. For example, the AMCC signal generation unit 241 generates an AMCC signal for instructing the management control device 60 to request wavelength assignment for communicating with an optical gateway positioned in another network. The AMCC signal generation unit 241 outputs the generated AMCC signal to the transmission timing control unit 242, and outputs information on the data length of the AMCC signal to the size calculation unit 233. Thereafter, the processing from step S102 to step S105 is executed.

Through the processing from step S102 to step S105, the ONU 20 is assigned a transmission timing and a transmission amount from the OLT 10b. The transmission timing control unit 242 controls the optical transmitting unit 25 based on the acquired information on the transmission timing to superimpose the AMCC signal on the main signal. The AMCC signal superimposition unit 252 superimposes the AMCC signal on the main signal under the control of the transmission timing control unit 242 (step S302). The main signal on which the AMCC signal is superimposed is input to the optical signal generation unit 251. The optical signal generation unit 251 generates an optical signal by modulating the light output from the light source with the main signal on which the AMCC signal is superimposed. The optical signal generation unit 251 transmits the generated optical signal to the management control device 60 (step S303).

The optical receiving unit 61 of the management control device 60 converts the input optical signal into an electric signal. The AMCC signal extraction unit 62 extracts the AMCC signal from the electric signal converted by the optical receiving unit 61 (step S304). The AMCC signal extraction unit 62 outputs the extracted AMCC signal to the AMCC signal receiving unit 63. The AMCC signal receiving unit 63 receives the output AMCC signal (step S305). Thereafter, the AMCC signal receiving unit 63 performs management and control based on the received AMCC signal.

With the optical access system 1b according to the third embodiment configured as described above, the same effects as those of the first embodiment can be achieved.

Furthermore, in the optical access system 1b according to the third embodiment, in addition to the TWDM-PON, it is possible to monitor and control different networks with one uplink wavelength.

Fourth Embodiment

In the fourth embodiment, the management control device positioned in another network notifies the OLT of the information on the data length of the AMCC signal via an interface for coordination or a network dedicated to control. Communication is performed between the OLT and the ONU by a method (for example, PON) different from a communication method between the management control device and the ONU. In the fourth embodiment, as a premise, it is assumed that communication such as periodic communication for vital monitoring is performed between the management control device and the ONU, and the management control device ascertains the information amount transmitted from the ONU (for example, information on the data length of the AMCC signal, information included in the AMCC signal, and the like) and the transmission time from the ONU.

Figure 11:
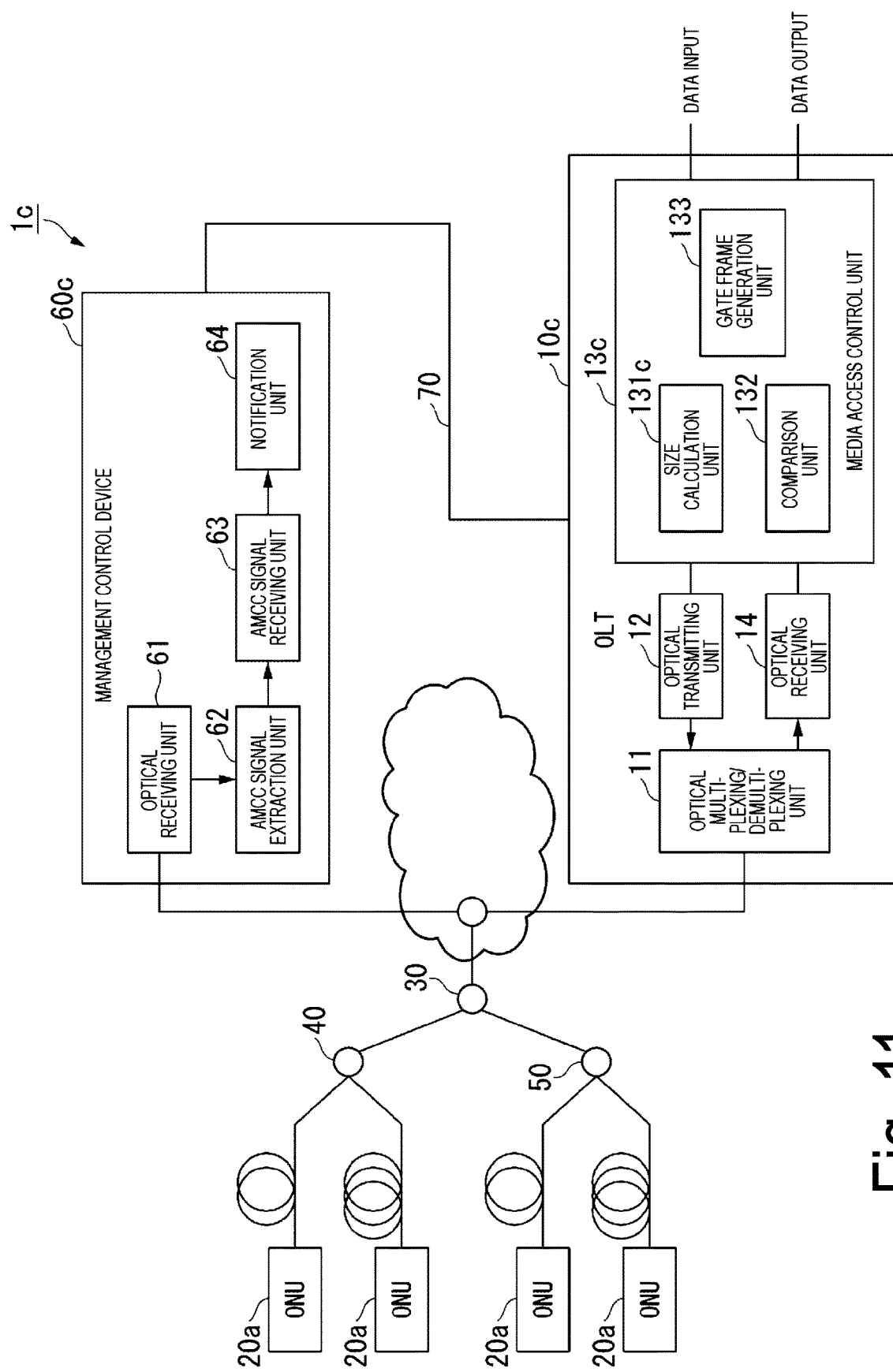
FIG. 11 is a diagram illustrating a configuration example of an optical access system according to a fourth embodiment.
Figure 12:
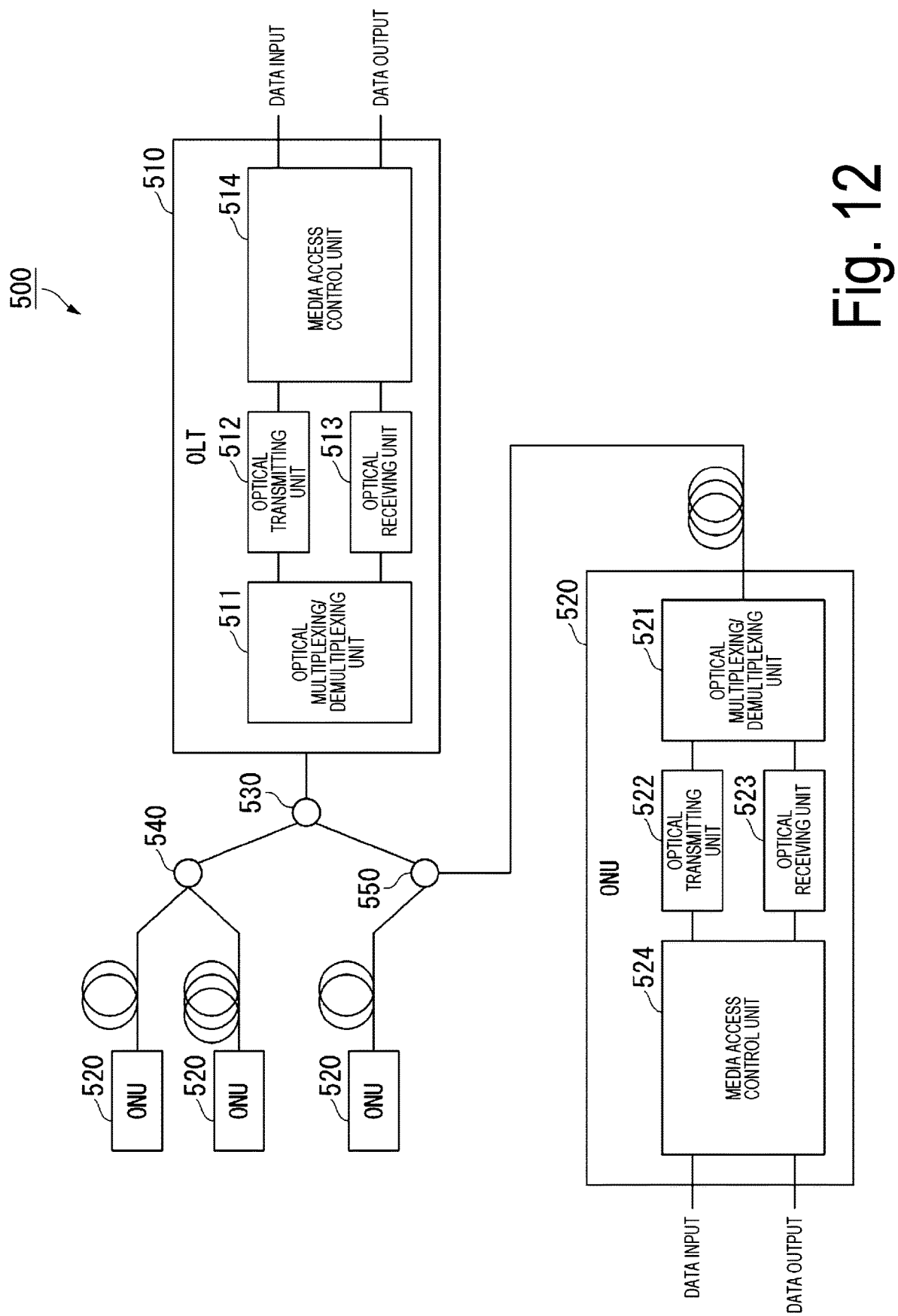
FIG. 12 is a diagram illustrating a configuration of a conventional TDM-PON system.
Figure 13:
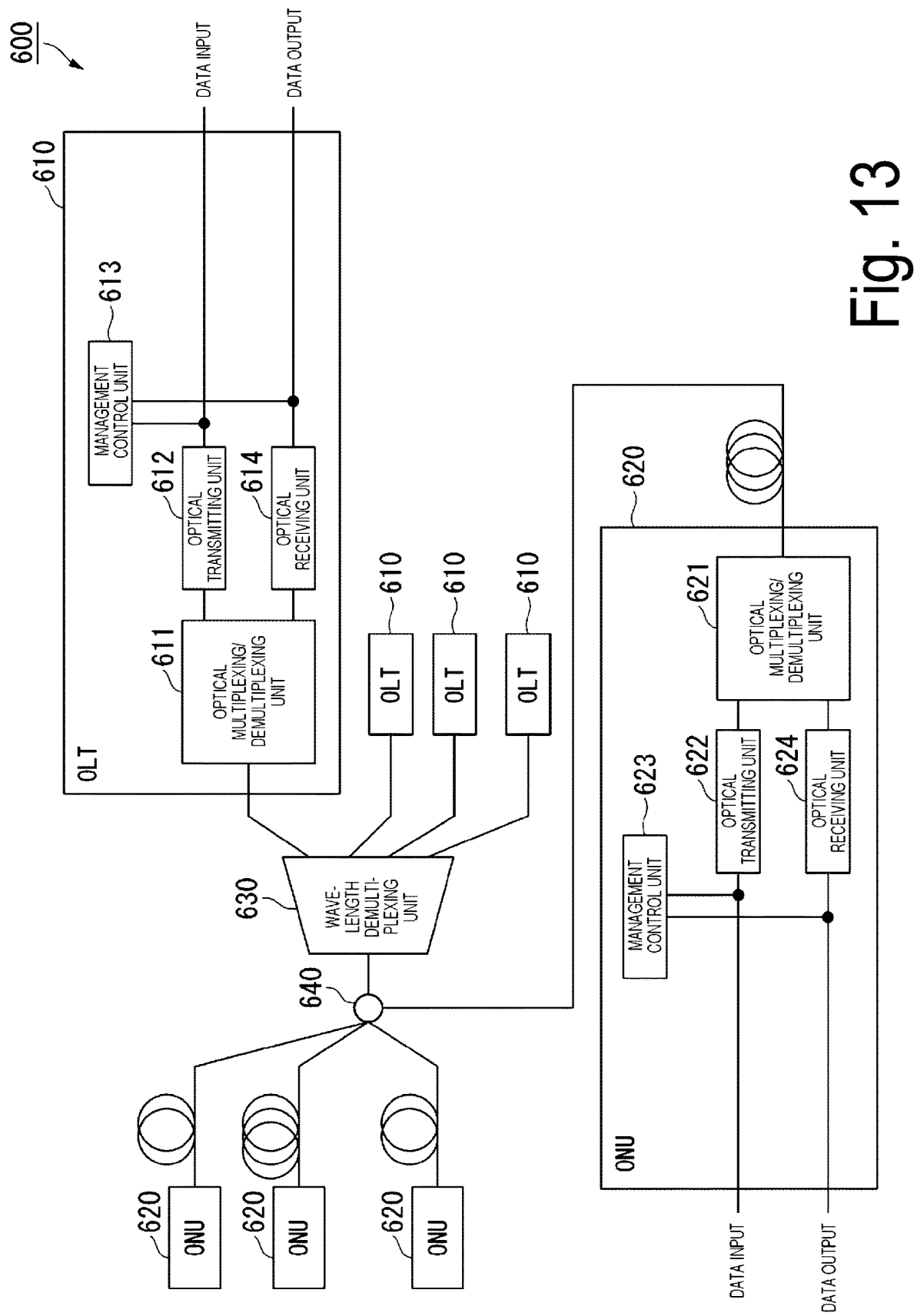
FIG. 13 is a diagram illustrating a configuration of a conventional PtP WDM-PON system.

FIG. 11 is a diagram illustrating a configuration example of an optical access system 1c in a fourth embodiment.

The optical access system 1c includes an OLT 10c, one or more ONUs 20a, and a management control device 60c. The OLT 10c, the ONU 20a, and the management control device 60c are connected to one or more optical splitters 30, 40, and 50 by optical fibers. The OLT 10c and the management control device 60c are connected via a connection line 70 using an interface for cooperation, a network dedicated to control, or the like.

The ONU 20a has a configuration similar to that of the second embodiment, but is different from that of the second embodiment in that the transmission destination of the AMCC signal is not the OLT 10c but the management control device 60c. The ONU 20a transmits a main signal to the OLT 10c and transmits an AMCC signal to the management control device 60c. For example, the ONU 20a performs communication such as periodic communication for vital monitoring with the management control device 60c using the AMCC signal. The ONU 20a notifies the OLT 10c of the information on the data length of the main signal accumulated in the buffer similarly to the second embodiment.

The configuration of the OLT 10c is different from that of the OLT 10a in that the management control unit 15 is not provided and a size calculation unit 131c is provided instead of the size calculation unit 131, but is similar to the OLT 10a in other configurations. The size calculation unit 131c calculates the converted data length by using the information on the data length of the AMCC signal acquired from the management control device 60c via the connection line 70 and the information on the data length of the main signal notified from the ONU 20a.

The management control device 60c includes the optical receiving unit (receiver) 61, the AMCC signal extraction unit (signal extractor) 62, the AMCC signal receiving unit 63, and a notification unit 64.

The management control device 60c is different from the management control device 60 in that the notification unit 64 is newly provided. The other configurations of the management control device 60c are similar to those of the management control device 60. Therefore, the entire description of the management control device 60c will be omitted, and the notification unit 64 will be described.

The notification unit 64 notifies the OLT 10c of the information on the data length of the AMCC signal via the connection line 70 in response to a predetermined timing or a request from the OLT 10c.

With the optical access system 1c according to the fourth embodiment configured as described above, the same effects as those of the second embodiment can be achieved.

Furthermore, in the optical access system 1c according to the fourth embodiment, in addition to the TWDM-PON, it is possible to monitor and control different networks with one uplink wavelength.

Furthermore, in the optical access system 1c according to the fourth embodiment, the management control device 60c ascertains the information on the data length and the transmission time of the AMCC signal transmitted from the ONU 20a by exchange with the ONU 20a. Then, the management control device 60c notifies the OLT 10c of the information on the data length of the AMCC signal transmitted from the ONU 20*a* via the connection line 70. The OLT 10*c* is separately notified of the information on the data length of the main signal from the ONU 20*a*. As a result, the OLT 10*c* can ascertain the transmission amount required for the ONU 20*a* to transmit the AMCC signal. Therefore, the OLT 10*c* can assign a data transmission timing and a data transmission amount to the ONU 20*a*.

Modification examples common to the first to fourth embodiments will be described.

In the first to fourth embodiments, the OLT 10, 10*a*, 10*b*, 10*c* and the ONU 20, 20*a* use "low-frequency pilot tone" that performs processing (for example, superimposition or separation) on the AMCC signal in the electrical stage on both the transmission side and the reception side. However, "baseband modulation" that performs processing (for example, superimposition or separation) on the AMCC signal in the optical stage on both the transmission side and the reception side may be used. Furthermore, the AMCC signal may be processed at the optical stage on the transmission side, and the AMCC signal may be separated at the electrical stage on the reception side, or the AMCC signal may be processed at the electrical stage on the transmission side, and the AMCC signal may be separated at the optical stage on the reception side.

The topology of the OLTs 10, 10*a*, 10*b*, and 10*c* and the ONUs 20 and 20*a* in the first to fourth embodiments is not limited to the passive double star, and may be a bus type or a ring type.

In the first to fourth embodiments, it has been described that communication is performed between the OLTs 10, 10*a*, 10*b*, and 10*c* and the ONUs 20 and 20*a* by the TDM-PON method. However, the present invention is not limited to TDM-PON, and various division multiplexing techniques such as wavelength division multiplexing, code division multiplexing, and frequency division multiplexing may be combined with TDM.

When the frame of the main signal becomes longer (for example, an IFG or a dummy pattern is inserted) depending on the data length of the AMCC signal as in the first to fourth embodiments, it is conceivable that the transmission efficiency of the main signal decreases. Therefore, the OLTs 10, 10*a*, 10*b*, and 10*c* may be configured to determine whether or not to permit the superimposition of the AMCC signal according to the availability of the uplink band assignment, the priority of the AMCC signal, and the like. Specifically, the report processing unit 231, 231*a* of each of the ONUs 20 and 20*a* associate the report frame with information on the type or priority of the AMCC signal. Examples of the type of the AMCC signal include a failure alarm and monitoring information.

The gate frame generation unit 133 of each of the OLTs 10, 10*a*, 10*b*, and 10*c* permits transmission of an AMCC signal having a priority equal to or higher than a threshold value, such as a failure alarm, regardless of availability. That is, the gate frame generation unit 133 assigns the requested band. On the other hand, the gate frame generation unit 133 performs scheduling to delay the transmission timing of the AMCC signal less than the predetermined priority.

With the above configuration, it is possible to preferentially assign a band to the ONUs 20 and 20*a* to which more important signals are desired to be transmitted.

The OLTs 10, 10*a*, 10*b*, and 10*c*, the ONUs 20 and 20*a*, and the management control device 60 in the above-described embodiments may be realized by a computer. In such a case, the OLTs 10, 10*a*, 10*b*, and 10*c*, the ONUs 20 and 20*a*, and the management control device 60 may be realized by recording a program for realizing their functions in a computer-readable recording medium, and causing a computer system to read and execute the program recorded in the recording medium. Note that the "computer system" mentioned herein includes an OS and hardware such as a peripheral device.

Also, the "computer-readable recording medium" refers to a portable medium such as a flexible disk, a magneto-optical disk, a ROM, or a CD-ROM, or a storage device such as a hard disk included in the computer system. Further, the "computer-readable recording medium" may include a medium that dynamically holds the program for a short time, such as a communication line in a case where the program is transmitted via a network such as the Internet or a communication line such as a telephone line, and a medium that holds the program for a certain period of time, such as a volatile memory inside the computer system serving as a server or a client in that case. Also, the above program may be for implementing some of the functions described above, may be formed with a combination of the functions described above and a program already recorded in the computer system, or may be formed with a programmable logic device such as an FPGA.

Although the embodiments of the present invention have been described in detail with reference to the drawings, specific configurations are not limited to the embodiments, and include design and the like within the scope of the present invention without departing from the gist of the present invention.

INDUSTRIAL APPLICABILITY

The present invention can be applied to an optical access system that performs at least time division multiplexing.

REFERENCE SIGNS LIST

10, 10*a*, 10*b*, 10*c* OLT (optical communication device)
20, 20*a* ONU (optical communication device)
60 Management control device (optical communication device)
11, 21 Optical multiplexing/demultiplexing unit
14, 22 Optical receiving unit
13, 13*a*, 23, 23*a* Media access control unit
15, 24, 24*a* Management control unit
12, 25 Optical transmitting unit
133 Gate frame generation unit (band assignment unit)
231, 231*a* Report processing unit (band request unit)
232 Gate processing unit
131, 233 Size calculation unit
132, 234 Comparison unit
241, 241*a* AMCC signal generation unit
242 Transmission timing control unit
251 Optical signal generation unit
252 AMCC signal superimposition unit

The invention claimed is:

1. An optical communication device that communicates with another optical communication device using at least a time division multiplexing method, the optical communication device comprising:
a processor; and
a storage medium having computer program instructions stored thereon, when executed by the processor, perform to:
request a band for transmitting a AMCC signal used for management and control; and generate the AMCC signal; and a transmitter configured to transmit the AMCC signal as a burst signal using a band assigned to be able to transmit data having a data length or more obtained based on a transmission rate of the AMCC signal, a transmission rate of a main signal, and a data length of the AMCC signal.

2. The optical communication device according to claim 1, wherein the computer program instructions further perform to:
calculate a converted data length based on a following formula (1) using AMCC signal transmission rate indicating the transmission rate of the AMCC signal, the transmission rate of the main signal, and AMCC signal data length indicating the data length of the AMCC; and
compare the data length of the converted data length with a data length of the main signal accumulated in a buffer, and
generates a report frame including an assigned amount of a band required for transmitting the AMCC signal as longer of the converted data length or the data length of the main signal $$\text{Converted data length} = \frac{\text{AMCC signal data length [byte]} \times 8}{\text{AMCC signal transmission rate [bit/s]}} \times \text{main signal transmission rate [bit/}x\text{]}. \quad \text{Formula (1)}$$

3. An optical communication device that communicates with another optical communication device using at least a time division multiplexing method, the optical communication device comprising:
a processor; and
a storage medium having computer program instructions stored thereon, when executed by the processor, perform to:
calculate a converted data length based on a following formula (1) using AMCC signal transmission rate indicating a transmission rate of an AMCC signal used for management and control, main signal transmission rate indicating a transmission rate of a main signal, and AMCC signal data length indicating a data length of the AMCC signal notified from the another optical communication device;
compare the data length of the converted data length with a data length of the main signal accumulated in a buffer of the other optical communication device; and
determine a band to be assigned to the other optical communication device according to a comparison result of the comparator, and transmits a gate frame including information of an assigned amount of the determined band to the other optical communication device $$\text{Converted data length} = \frac{\text{AMCC signal data length [byte]} \times 8}{\text{AMCC signal transmission rate [bit/s]}} \times \text{main signal transmission rate [bit/}x\text{]}. \quad \text{Formula (1)}$$

4. An optical access system that performs communication between a first optical communication device and a second optical communication device using at least a time division multiplexing method, wherein
the first optical communication device includes
a processor; and
a storage medium having computer program instructions stored thereon, when executed by the processor, perform to:
request a band for transmitting a AMCC signal used for management and control, and generate the AMCC signal; and
a transmitter configured to transmit the AMCC signal as a burst signal using a band assigned to be able to transmit data having a data length or more obtained based on a transmission rate of the AMCC signal, a transmission rate of a main signal, and a data length of the AMCC signal generated by the AMCC signal generation unit, and
the second optical communication device includes
a processor; and
a storage medium having computer program instructions stored thereon, when executed by the processor, perform to assign a band requested by the first optical communication device.

5. The optical access system according to claim 4, further comprising:
a third optical communication device positioned in a network different from networks of the first optical communication device and the second optical communication device, wherein
the third optical communication device includes
a receiver configured to receive the burst signal transmitted from the first optical communication device,
a processor; and
a storage medium having computer program instructions stored thereon, when executed by the processor, perform to signal included in the burst signal received by the receiver.

6. The optical access system according to claim 5, wherein the computer program instructions of the second optical communication device further perform to
calculate a converted data length based on a following formula (1) using AMCC signal transmission rate indicating the transmission rate of the AMCC signal, the transmission rate of the main signal, and AMCC signal data length indicating the data length of the AMCC signal, and
compare the data length of the converted data length with a data length of the main signal accumulated in a buffer of the first optical communication device, and
determines a band to be assigned to the first optical communication device according to a comparison result of the comparator, and transmits a gate frame including information of an assigned amount of the determined band to the first optical communication device $$\text{Converted data length} = \frac{\text{AMCC signal data length [byte]} \times 8}{\text{AMCC signal transmission rate [bit/s]}} \times \text{main signal transmission rate [bit/}x\text{]}. \quad \text{Formula (1)}$$

7. The optical access system according to claim 6, wherein the computer program instructions of the third optical communication device further perform to notify the second optical communication device of at least information on the data length of the AMCC signal via another line, and calculates the converted data length based on the formula (1) using by using information on the data length of the AMCC signal.

* * * * *